United States Patent
Cheng et al.

(10) Patent No.: US 10,644,594 B2
(45) Date of Patent: May 5, 2020

(54) POWER CONVERTER WITH REDUCED UNDERSHOOT AND OVERSHOOT DURING LOAD TRANSIENTS

(71) Applicant: Texas Instruments Incorporated, Dallas, TX (US)

(72) Inventors: Kuang-Yao Cheng, Bedford, NH (US); Preetam Tadeparthy, Bangalore (IN); Muthusubramanian Venkateswaran, Bengaluru (IN); Vikram Gakhar, Bangalore (IN); Dattatreya Baragur Suryanarayana, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 21 days.

(21) Appl. No.: 15/799,327

(22) Filed: Oct. 31, 2017

(65) Prior Publication Data
US 2019/0131872 A1  May 2, 2019

(51) Int. Cl.
| | | |
|---|---|---|
| G05F 1/10 | (2006.01) | |
| H02M 3/157 | (2006.01) | |
| H02M 3/158 | (2006.01) | |
| H02M 1/00 | (2006.01) | |
| H02M 3/156 | (2006.01) | |

(52) U.S. Cl.
CPC .......... *H02M 3/157* (2013.01); *H02M 3/1584* (2013.01); *H02M 3/1588* (2013.01); *H02M 2001/0012* (2013.01); *H02M 2003/1566* (2013.01); *H02M 2003/1586* (2013.01)

(58) Field of Classification Search
CPC ................ H02M 1/04; H02M 3/158; H02M 2001/0012; Y02B 70/1466

USPC ................. 323/224, 225, 271–272, 282–288
See application file for complete search history.

(56) References Cited

U.S. PATENT DOCUMENTS

| | | | | | |
|---|---|---|---|---|---|
| 5,077,652 | A | * | 12/1991 | Faley | H02M 3/33507 363/132 |
| 5,469,115 | A | * | 11/1995 | Peterzell | H03G 3/3078 330/129 |
| 5,514,947 | A | * | 5/1996 | Berg | G05F 1/44 323/282 |
| RE38,140 | E | * | 6/2003 | Schaffer | H02M 3/1584 323/282 |
| 6,912,144 | B1 | * | 6/2005 | Clavette | H02M 3/1584 323/283 |
| 8,907,642 | B1 | * | 12/2014 | Burstein | H02M 3/158 323/272 |
| 9,362,824 | B2 | * | 6/2016 | Ouyang | H02M 3/156 |
| 9,467,046 | B2 | * | 10/2016 | Nikitin | H02M 3/156 |
| 9,917,514 | B2 | * | 3/2018 | Schmitz | H02M 3/158 |
| 2004/0242170 | A1 | * | 12/2004 | Gilbert | H03G 3/3047 455/127.1 |

(Continued)

*Primary Examiner* — Rajnikant B Patel
(74) *Attorney, Agent, or Firm* — Mark Allen Valetti; Charles A. Brill; Frank D. Cimino

(57) ABSTRACT

A control circuit for a DC-DC converter and a DC-DC converter are disclosed. The control circuit includes an integrator coupled to receive a first reference voltage and a first voltage that includes an output voltage for the DC-DC converter and to provide an integrated error signal. A first comparator is coupled to receive the first reference voltage and the first voltage and to provide a dynamic-integration signal that adjusts the integration time constant of the integrator.

16 Claims, 11 Drawing Sheets

(56) References Cited

U.S. PATENT DOCUMENTS

| | | | | |
|---|---|---|---|---|
| 2006/0001408 A1* | 1/2006 | Southwell | ............ | H02M 3/1584 |
| | | | | 323/282 |
| 2009/0261797 A1* | 10/2009 | Shibata | ................... | H02M 1/36 |
| | | | | 323/288 |
| 2011/0316508 A1* | 12/2011 | Cheng | ..................... | H02M 1/14 |
| | | | | 323/282 |
| 2014/0268909 A1* | 9/2014 | Digiacomo | ........ | H02M 3/33553 |
| | | | | 363/21.04 |

* cited by examiner

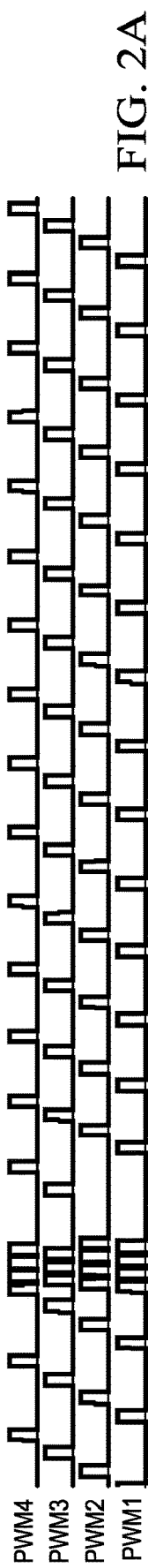
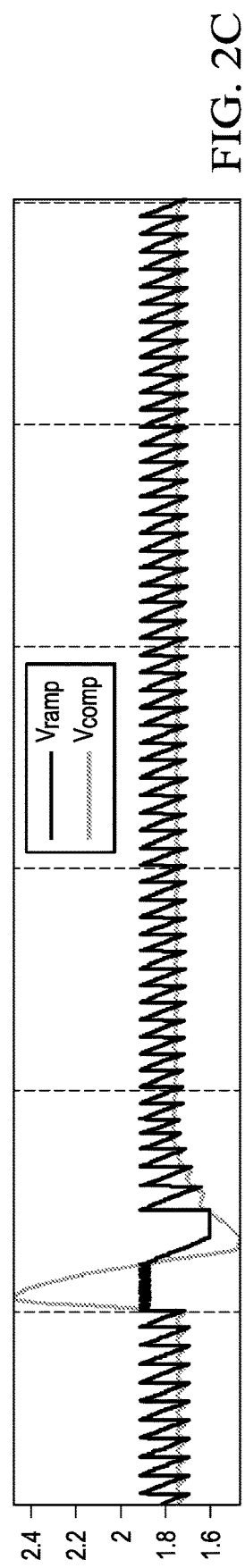
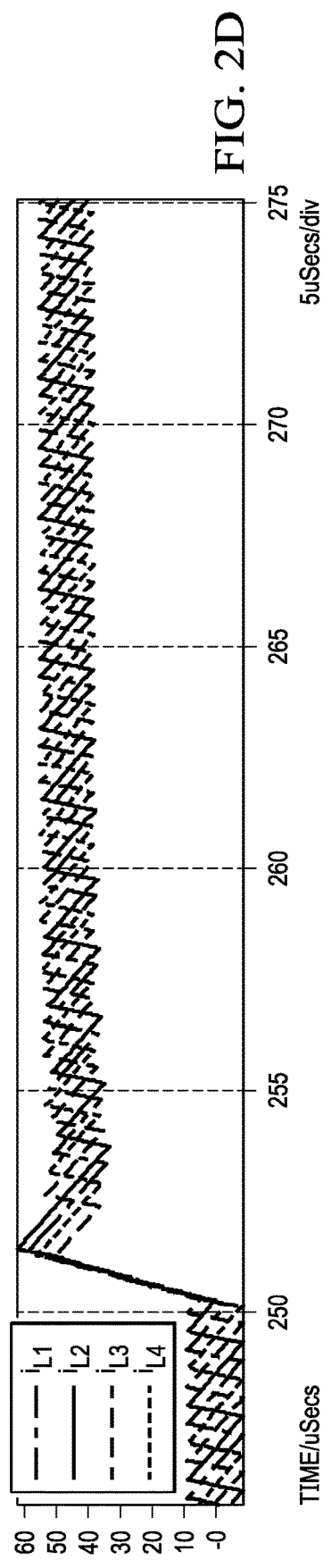
FIG. 2A
FIG. 2B
FIG. 2C
FIG. 2D

POWER CONVERTER WITH REDUCED UNDERSHOOT AND OVERSHOOT DURING LOAD TRANSIENTS

FIELD OF THE DISCLOSURE

Disclosed implementations relate generally to the field of DC-DC converters. More particularly, and not by way of any limitation, the present disclosure is directed to an apparatus for dynamic integration management for load transient improvements of DC-DC converters.

BACKGROUND

Load transient requirements for voltage regulators and other DC-DC converters for powering microprocessors are very stringent: greater than 180 amperes load steps at 800 A/µs slew rate with variable load duty ratios, e.g., from ten to ninety percent, and variable load frequencies, e.g., from 1 kHz to 1 MHz. A voltage undershoot is not allowed during any load transient event to avoid crashing the system. In the voltage control loop, an integrator is normally used to improve the DC regulation accuracy in steady-state. However, during high frequency load transient events, the integration may not have a chance to settle.

SUMMARY

Disclosed implementations utilize an additional comparator that operates to change the integration constant of the integrator responsive to a given difference between a desired output voltage and a value that includes an actual output voltage and can also include a voltage that is proportional to the total inductor current. Using the additional comparator, the circuit provides an "asymmetric" integration during load transients that occur at high rates of repetition. The asymmetric integration provides an intended DC offset of the regulated output voltage that helps undershoot performance. This improvement in undershoot performance is not limited to the load frequency being within the loop bandwidth, but provides enhanced undershoot performance even beyond the loop bandwidth. This enhanced performance does not rely on additional output capacitance.

In one aspect, an implementation of a control circuit for a DC-DC converter is disclosed. The control circuit includes an integrator coupled to receive a first reference voltage and a first voltage that comprises an output voltage for the DC-DC converter, the integrator being further coupled to provide an integrated error signal; and a first comparator coupled to receive the first reference voltage and the first voltage and to provide a dynamic-integration signal that adjusts the integration time constant of the integrator.

In another aspect, an implementation of a DC-DC converter is disclosed. The DC-DC converter includes an integrator coupled to receive a first reference voltage and a first voltage that comprises an output voltage for the DC-DC converter, the integrator being further coupled to provide an integrated error signal; and a first comparator coupled to receive the first reference voltage and the first voltage and to provide a dynamic-integration signal that adjusts the integration time constant of the integrator.

BRIEF DESCRIPTION OF THE DRAWINGS

The present disclosure illustrates example implementations in connection with the figures of the accompanying drawings in which like references indicate similar elements.

It should be noted that different references to "an" or "one" example in this disclosure are not necessarily to the same example, and such references may mean at least one. Further, when a particular feature, structure, or characteristic is described in connection with an example implementation, it is submitted that it is within the knowledge of one skilled in the art to effect such feature, structure, or characteristic in connection with other implementations whether or not explicitly described. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

Figure 1A:
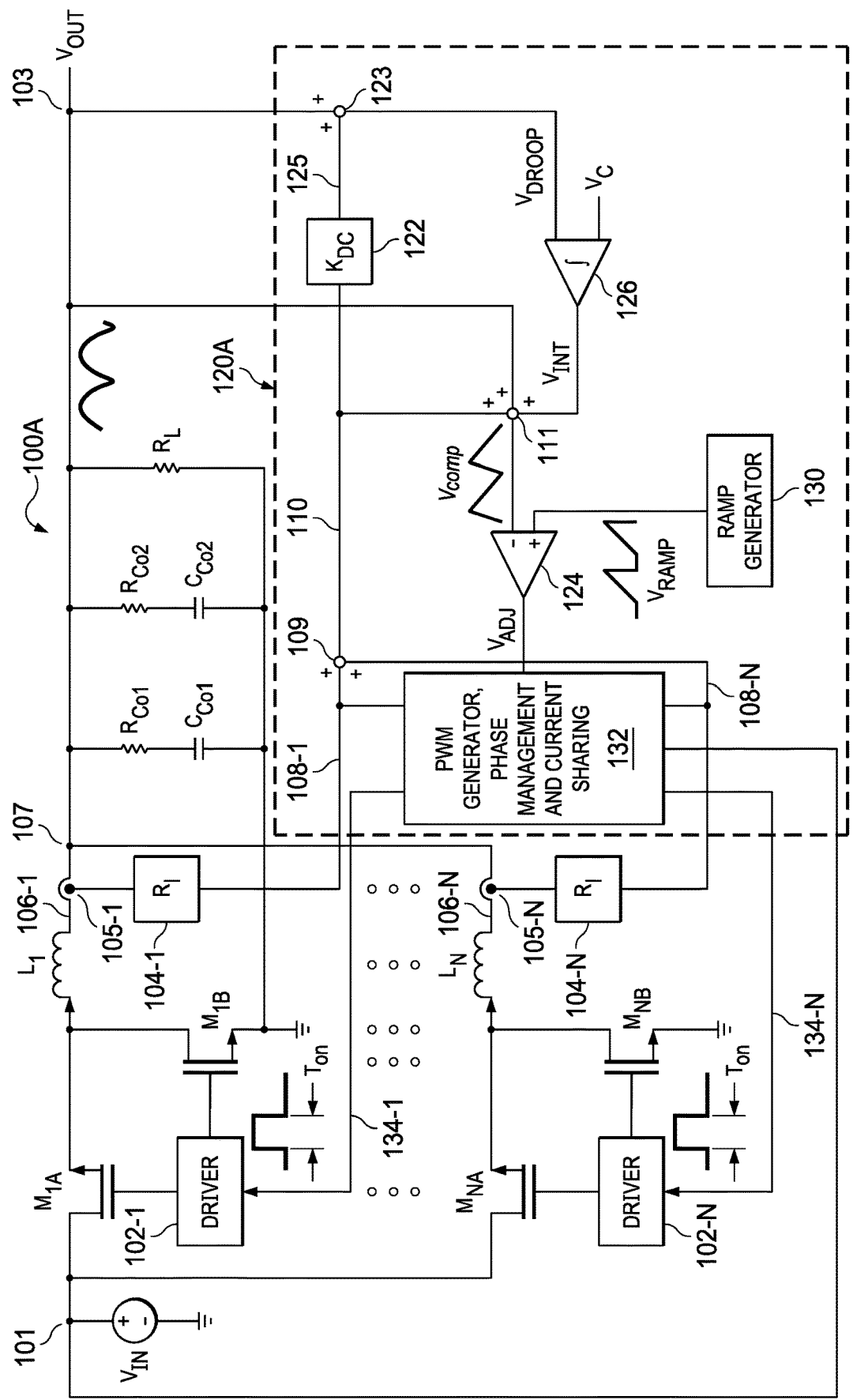
Figure 1B:
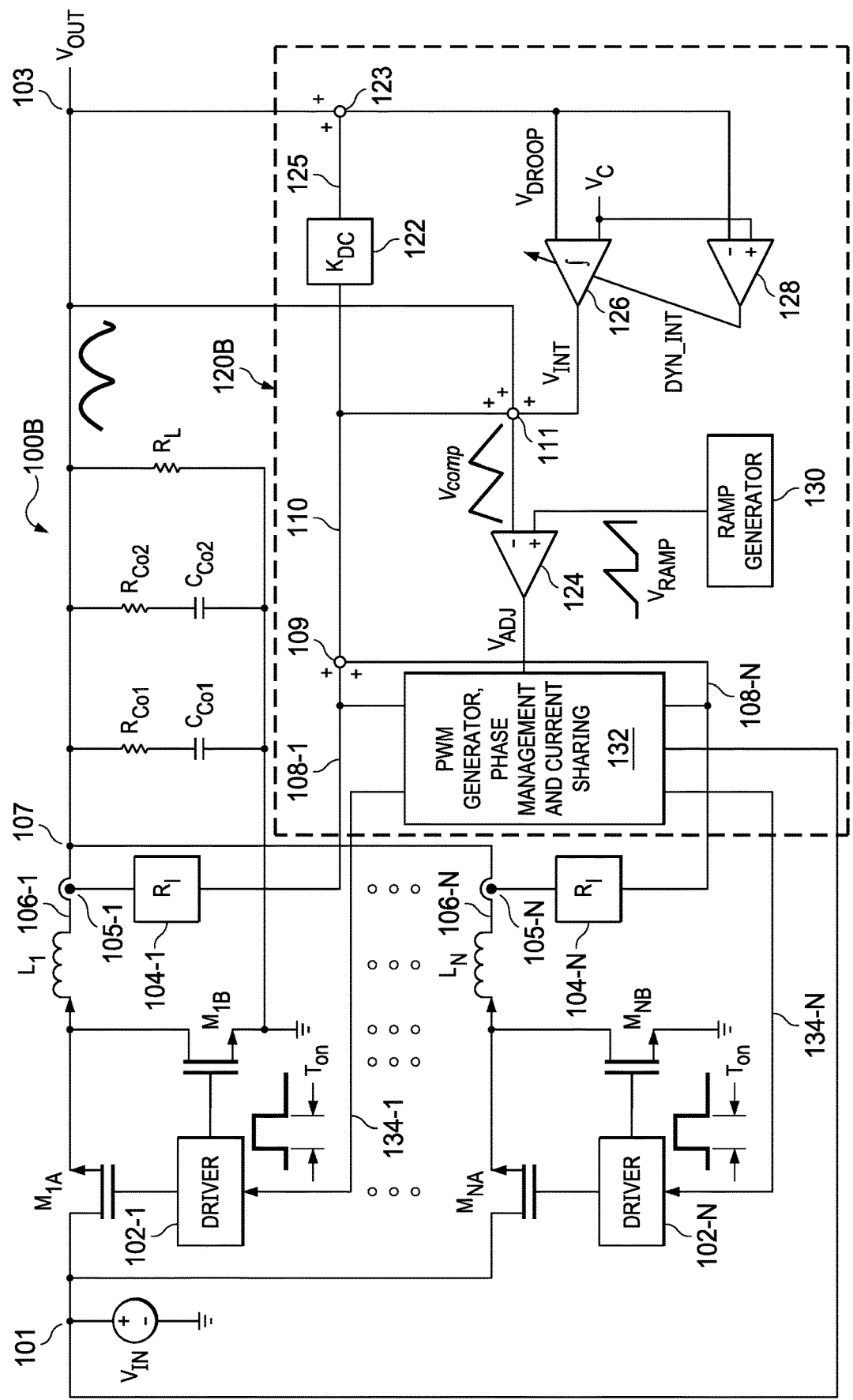
Figure 1C:
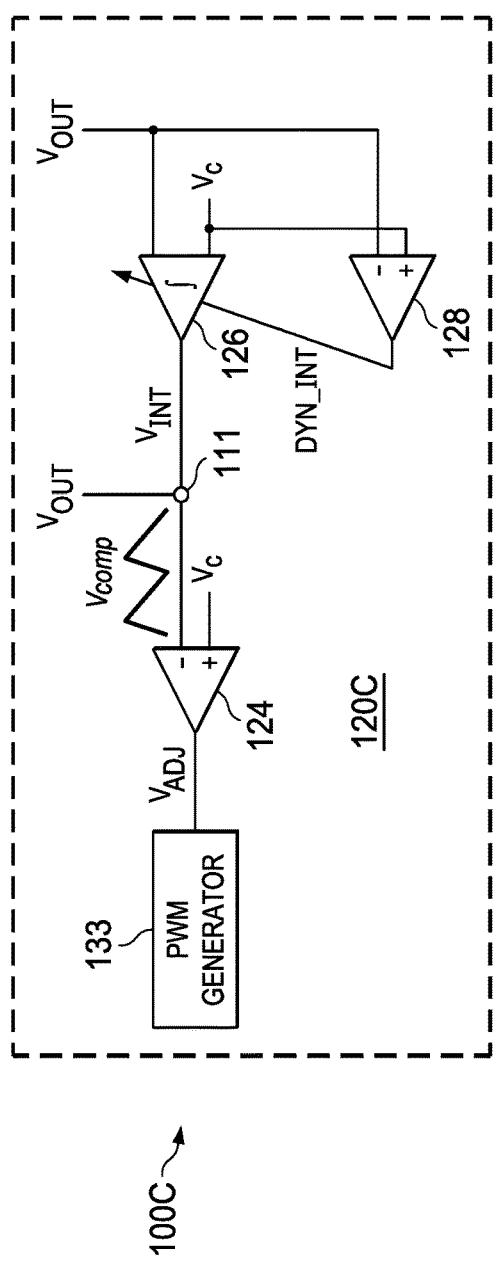
Figure 5:
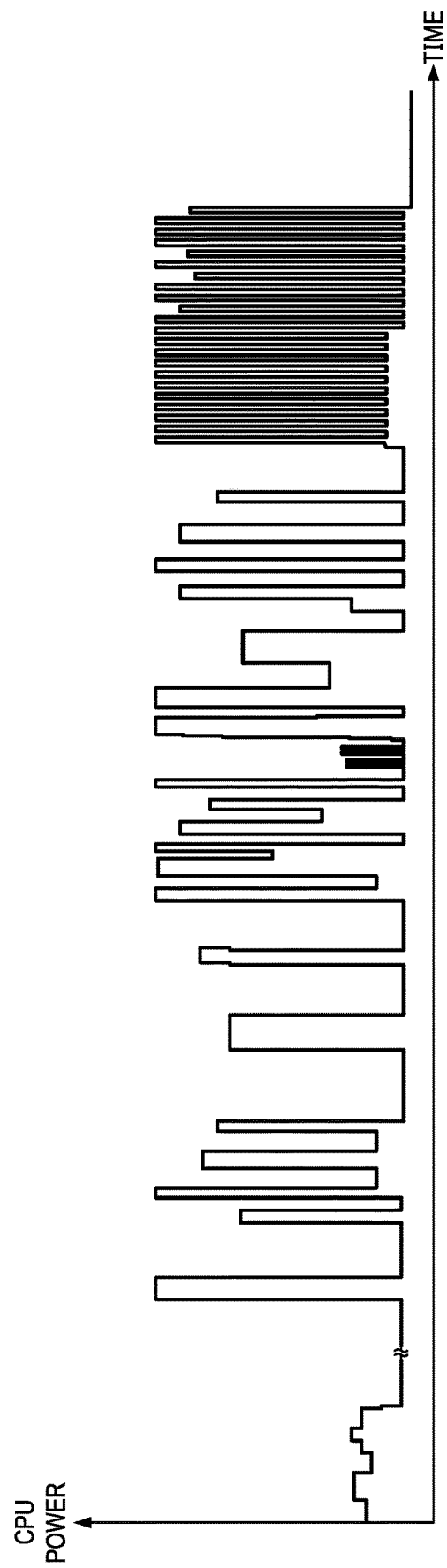
Figure 3A:
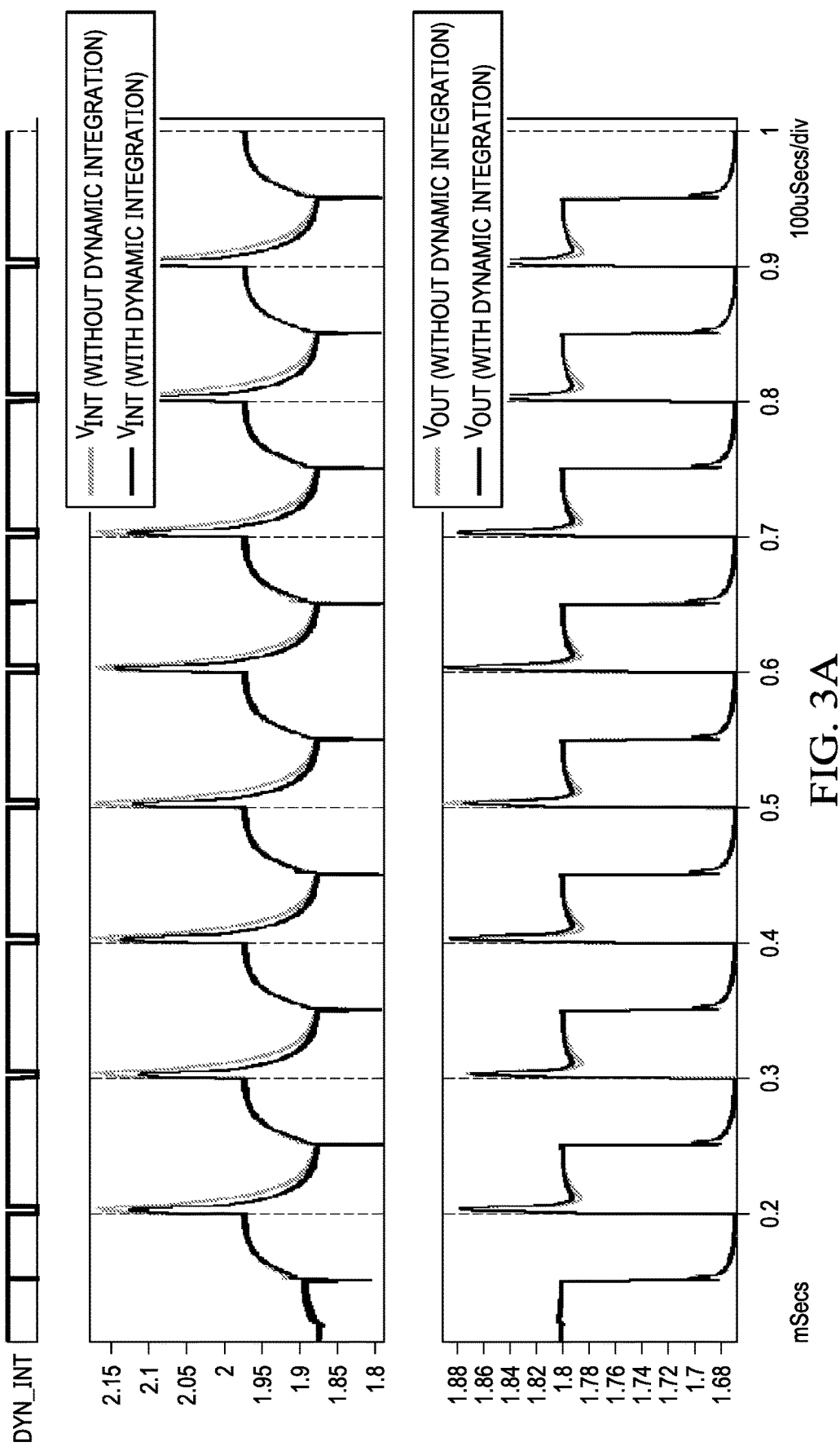
Figure 3B:
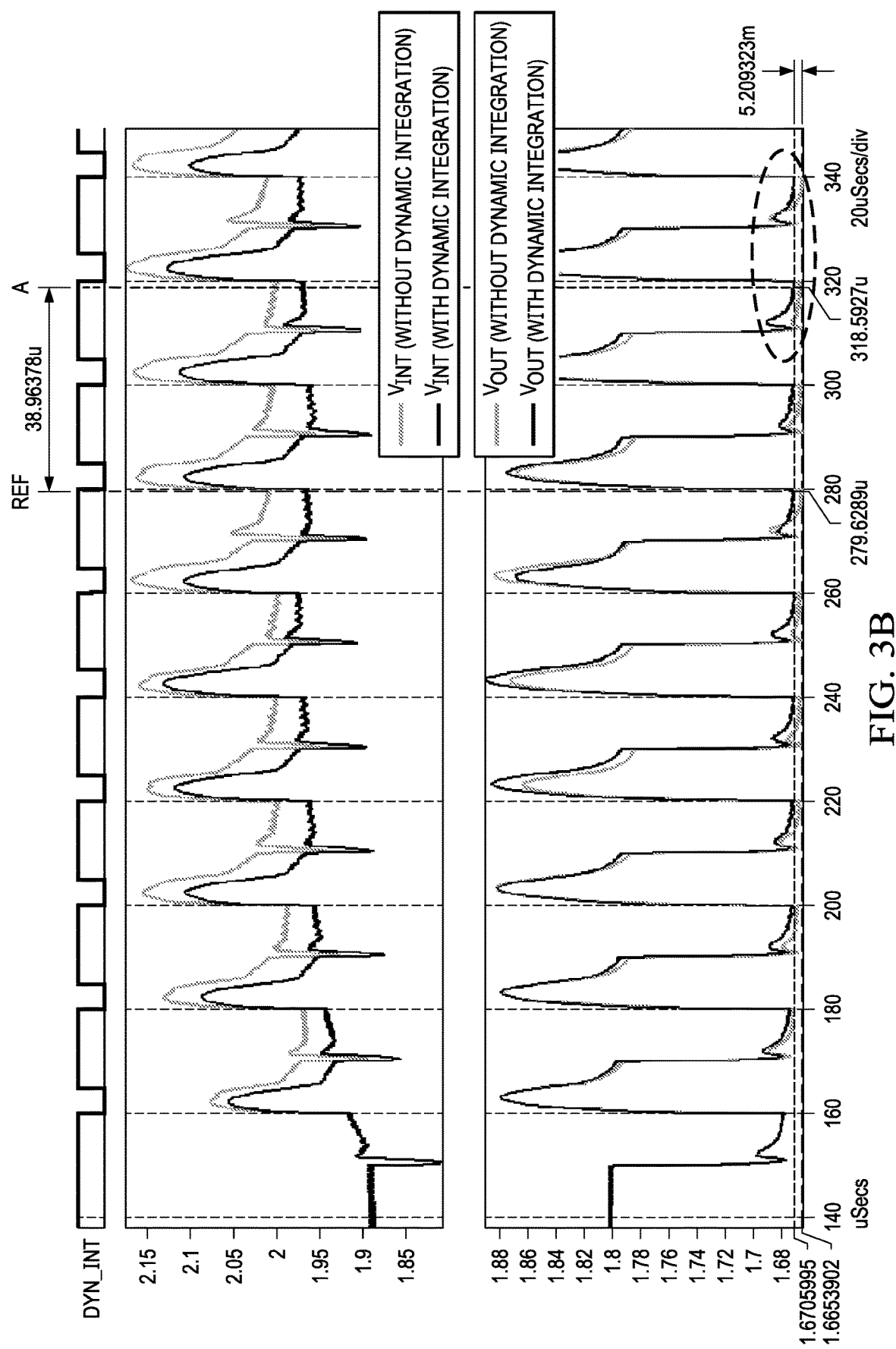
Figure 3C:
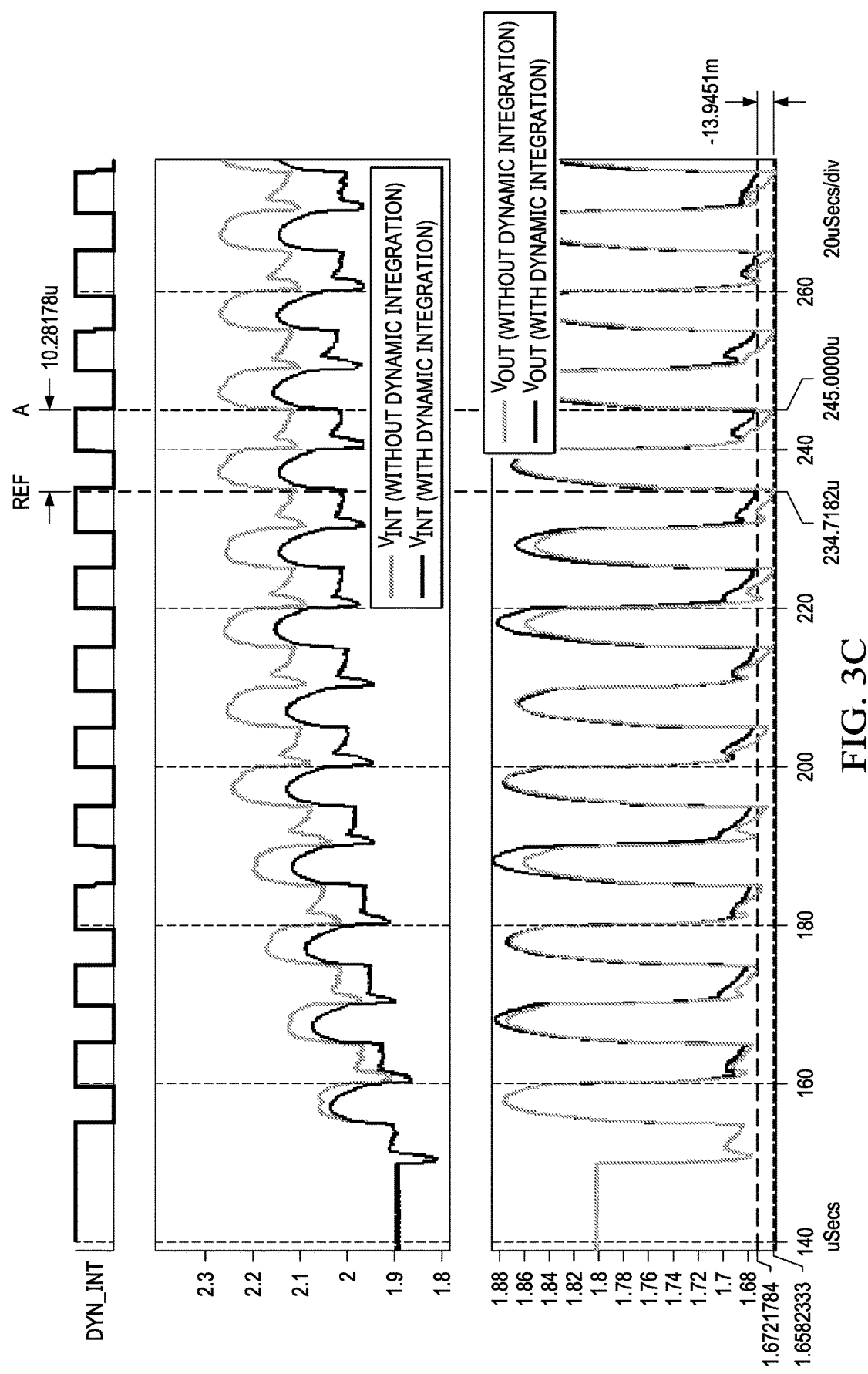

The accompanying drawings are incorporated into and form a part of the specification to illustrate one or more example implementations of the present disclosure. Various advantages and features of the disclosure will be understood from the following Detailed Description taken in connection with the appended claims and with reference to the attached drawing figures in which:

FIG. 1A depicts an example of a multiphase DC-DC converter and control circuit that can be modified to utilize the disclosed integration management;

FIG. 1B depicts an example of a multiphase DC-DC converter and control circuit according to an implementation of the disclosure;

FIG. 1C depicts an example control circuit for a DC-DC converter according to an implementation of the disclosure;

FIGS. 2A-2D depict example operational waveforms of the control scheme of FIG. 1A in the DC-DC converter in response to a drop in voltage on the output node;

FIG. 3A depicts simulated signals for DYN_INT, $V_{INT}$ and $V_{OUT}$ at 10 kHz load frequency both with and without the disclosed dynamic integration;

FIG. 3B depicts simulated signals for DYN_INT, $V_{INT}$ and $V_{OUT}$ at 50 kHz load frequency both with and without the disclosed dynamic integration;

FIG. 3C depicts simulated signals for DYN_INT, $V_{INT}$ and $V_{OUT}$ at 100 kHz load frequency both with and without the disclosed dynamic integration;

FIGS. 4A-4D depict experimental results of load transients both with and without the disclosed dynamic integration; and FIG. 5 an example variable load experienced by a central processing unit (CPU) over time.

DETAILED DESCRIPTION OF THE DRAWINGS

Specific implementations of the invention will now be described in detail with reference to the accompanying figures. In the following detailed description of implementations of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

With growing demands on mobile devices, the related infrastructures, such as servers, storage, and other telecommunication equipment, are continually being upgraded with higher computing power, higher efficiency, and higher power densities. The microprocessors inside the equipment determine the computing power, and the DC-DC converters for powering these microprocessors are the key to improving the dynamic performance, reliability, and efficiency of the microprocessors with less cost and higher power densities. In order to fulfill the high-power requirements, multiphase DC-DC converters are utilized.

When the microprocessor is processing computations, it can generate large load transients with random frequencies for the associated DC-DC converters. FIG. 5 depicts an example of a variable load experienced by a CPU over time. As depicted in this example, both the amplitude of the power required and the frequency with which the requirements change can vary, depending on the specific applications being run. In order to provide fast load transient responses to the CPU, a fast control loop is necessary to ensure both undershoot and overshoot performance over the wide variations in load duties and frequencies. However, in supplying power to CPU processors, it is normal for the load frequency to extend beyond the bandwidth of the feedback loop. In this situation, the transient performance is determined by the decoupling capacitors, which can be increased for optimization.

In many power supply situations, the ideal aim is to provide a voltage that does not vary under any conditions. In real life, this means providing a feedback loop that returns the voltage to the intended value as soon as possible after a deviation. However, in some conditions, such as when supplying power to a CPU, the method of voltage regulation allow the voltage to drop somewhat when the current increases, as long as the voltage does not drop below a known threshold that can cause a fatal error. In order to regulate in this situation, the feedback loop includes a value that represents the total current generated by the various phases. As will be seen in an example below, the current generated in each phase can be translated to a representative voltage, which can then be combined with the output voltage. The resultant voltage then represents the combination of voltage and current and can be utilized to regulate the voltage.

Referring now to FIG. 1A, an example multiphase DC-DC converter 100A is shown as an example of the environment in which the disclosed integration management tools can be provided in order to improve load transients. While a specific example is shown in this figure, it will be understood that the disclosed improvements are not dependent on a specific architecture or topology, but are also applicable in managing transients in many other situations. For example, while a multiphase DC-DC converter is shown, the disclosed improvements are also applicable to a single phase DC-DC converter. Several specific variations to both the DC-DC converter and the control circuitry are mentioned in this disclosure; other variations will be evident to one skilled in the art.

DC-DC converter 100A is a multiphase DC-DC converter having N phases, where N is an integer greater than one, although only the first and the $N^{th}$ phases are illustrated. DC-DC converter 100A receives an input voltage $V_{IN}$ at node 101 and provides an output voltage $V_{OUT}$ at output node 103. The first phase of multiphase DC-DC converter 100A includes high-side transistor $M_{1A}$, which is coupled in series with low-side transistor $M_{1B}$ between node 101 and a lower rail, e.g. ground. A driver 102-1 is coupled to drive transistors $M_{1A}$, $M_{1B}$. A first terminal of inductor $L_1$ is coupled to a point between transistor $M_{1A}$ and $M_{1B}$; a second terminal of inductor $L_1$ is coupled to output node 103. Similarly, phase N of multiphase DC-DC converter 100A includes a high-side transistor $M_{NA}$ coupled in series with low-side transistor $M_{NB}$ between node 101 and the lower rail. Driver 102-N is coupled to drive transistors $M_{NA}$, $M_{NB}$; one terminal of inductor $L_N$ is coupled to a point between transistors $M_{NA}$ and $M_{NB}$ and a second terminal is coupled to output node 103. A pulse produced by the first phase is carried on line 106-1; a pulse produced by the $N^{th}$ phase is carried on line 106-N; and the pulses produced by all of the phases are joined together at node 107. Between node 107 and output node 103, a number of resistors and decoupling capacitors are coupled in parallel with output node $V_{OUT}$. In the example shown, resistor $R_{Co1}$ is coupled in series with capacitor $C_{Co1}$ and in parallel with the output node 103; resistor $R_{Co2}$ is coupled in series with capacitor $C_{Co2}$ and in parallel with the output node 103, and resistor $R_L$ is coupled in parallel with output node 103.

The control circuit 120A is generally encompassed by the dotted lines shown in FIG. 1A. In the example implementation shown, a current provided by phase 1 is detected at point 105-1, translated to a voltage at element $R_I$ 104-1, and provided as translated current 108-1; similarly, a current provided by phase N is detected at point 105-N, translated to a voltage at $R_I$ 104-N, and provided as translated current 108-N. As element $R_I$ translates the currents to respective voltages, a conversion ratio is applied, so that, for example, a 10 A current is translated to a 50 mV voltage. The various translated currents are summed at element 109 to provide a total translated current signal 110. At element 122, the total translated current signal 110 is multiplied by a droop constant $K_{DC}$, which is the inverse of a gain constant for the circuit, to provide a scaled total translated current signal 125. Scaled total translated current signal 125 is added to output voltage $V_{OUT}$ at adder 123 to provide a voltage droop value $V_{DROOP}$. The voltage droop value $V_{DROOP}$ is provided to integrator 126, which also receives a reference voltage $V_C$ representing the desired voltage to be provided by the circuit. The output of integrator 126 is the integrated error signal $V_{INT}$.

Adder 111 receives the total translated current signal 110, output signal $V_{OUT}$ and integrated error signal $V_{INT}$ and outputs a compensation voltage $V_{COMP}$. Comparator 124 receives compensation voltage $V_{COMP}$ on the inverting input and receives a reference voltage, which in the example shown is ramp signal $V_{RAMP}$, from ramp generator 130 on the non-inverting input. Ramp signal $V_{RAMP}$ is used to improve jitter performance; as we shall see, the use of ramp generator 130 and ramp signal $V_{RAMP}$ is not required in all architectures and other signals can be utilized for the comparison. Comparator 124 provides an adjustment voltage $V_{ADJ}$ to a pulse width modulator (PWM) generator, phase management and current sharing module 132 (hereinafter referred to simply as PWM generator 132). The inner feedback loop that contains the total translated current signal 110, output voltage $V_{OUT}$, and the ramp voltage $V_{RAMP}$ provides fast loop responses, while the outer loop that includes integrator 126 improves the accuracy of the output voltage regulations. PWM generator 132 receives each of the translated currents 108-1 through 108-N and provides control signals 134-1 through 134-N to each of drivers 102-1 through 102-N, providing a respective pulse shown as $T_{ON}$ for each respective driver. The operational waveforms for DC-DC converter 100A will be discussed first, followed by the problems encountered by DC-DC converter 100A.

FIG. 2 provides examples of the operational waveforms for DC-DC converter 100A during a load transient. In the example illustrated, DC-DC converter 100A is configured with four phases. In section A of FIG. 2, signals PWM1 through PWM4 represent the control signals 134 provided by control circuit 120A to the four phases. Initially, control signals PWM1-PWM4 are each controlling a driver 102 to provide a respective inductor current; these four inductor currents are summed to provide output voltage $V_{OUT}$, which is shown in section B of FIG. 2. In section C, the waveforms for ramp voltage $V_{RAMP}$ and compensation voltage $V_{COMP}$ are shown, while in section D, the waveforms for each of the four inductor currents are shown.

At the left side of FIG. 2, the output voltage $V_{OUT}$ is steady at 1.8 volts, while each of the individual inductor currents $I_{L1}$, $I_{L2}$, $I_{L3}$, $I_{L4}$ has a waveform centered at 0 amps. The waveform of ramp voltage $V_{RAMP}$ is centered around 1.8 volts, while compensation voltage $V_{COMP}$ has a waveform that is centered on a value slightly greater than 1.7 volts. In normal operation, whenever ramp voltage $V_{RAMP}$ and compensation voltage $V_{COMP}$ intersect, PWM generator 132 triggers one of the drivers 102 to turn on. At a point in time shown in this figure as 250 μs into the operation, the load increases, causing output voltage $V_{OUT}$ to drop from 1.8 V to about 1.68 V. As $V_{OUT}$ falls, the compensation voltage $V_{COMP}$ increases rapidly and the frequency of $V_{RAMP}$ increases, causing control signals PWM1 through PWM4 to fire as rapidly as possible. This in turn, causes the respective inductor currents $I_{L1}$, $I_{L2}$, $I_{L3}$, $I_{L4}$ to increase very rapidly. As the rate at which output voltage $V_{OUT}$ is dropping begins to lessen, compensation voltage $V_{COMP}$ starts to fall; control signals PWM1 through PWM4 are able to return to a slower firing rate and inductor currents $I_{L1}$, $I_{L2}$, $I_{L3}$, $I_{L4}$ stabilize at new values that center around about 43 amps. In the operation of many CPUs, allowing a decrease in voltage when an increase in current occurs is not only acceptable, but preferred. However, it is critical that the voltage $V_{OUT}$ not dip below a given threshold, as a value of $V_{OUT}$ below the threshold can cause a malfunction of the CPU and a reset condition. Using the feedback loop formed by translated currents 108, output signal $V_{OUT}$, and comparator 124, fast load transient performance can be achieved. After load transients, the voltage regulation can be regulated accurately at a slower pace using the loop that includes integrator 126.

In order to address the problem of undershoot, a new element is added to the basic structure shown in FIG. 1A and is shown in FIG. 1B as part of DC-DC converter 100B. DC-DC converter 100B contains all of the elements of DC-DC converter 100A. As shown in control circuit 120B, comparator 128 has been added. Comparator 128 receives the reference voltage $V_C$ on the non-inverting input and receives voltage droop value $V_{DROOP}$ on the inverting input and provides dynamic integration signal DYN_INT. Dynamic integration signal DYN_INT is provided to integrator 126 to dynamically adjust the integration time constant. This action creates a load frequency-dependent offset to the output voltages that improves the undershoot performance, even when the load frequency is beyond the loop bandwidth. The improved undershoot performance is accomplished with this simple adjustment and without adding additional output capacitance to the circuit.

FIGS. 3A-3C depict the simulated results of the effect of dynamic integration at different load frequencies. In each of these figures, the signal DYN_INT is shown across the top of the figure. The output of integrator 126, which is integrated error signal $V_{INT}$, is shown in the middle portion of the chart, where the waveforms are shown both with and without dynamic integration. In the lower portion of the chart, output voltage $V_{OUT}$ is shown; again waveforms both with and without dynamic integration are shown.

FIG. 3A illustrates the waveforms at low repetitive-rate load frequencies, which in this example is 10 kHz. As shown, output voltage $V_{OUT}$ is regulated and settled very well after load transients regardless whether the dynamic integration function is enabled or not. However, FIG. 3B illustrates the waveforms at a higher frequency, in this example 50 kHz. In this test, when the proposed dynamic integration was utilized, the output voltage received an offset that provided better undershoot performance. Examples of the lowest points of the output voltage in FIG. 3B are circled for emphasis. The lowest voltage increased from 1.6653902 volts to 1.6705995 volts, an increase of 5.2093 millivolts. FIG. 3C depicts the waveforms at 100 kHz. Here, the increase in the lowest voltage attained was even larger, increasing from 1.6582333 volts to 1.6721784 volts for an increase of 13.9451 millivolts. The typical margin for a current CPU is 22 millivolts, so the increases seen from this simple addition are relatively huge.

Figure 4A:
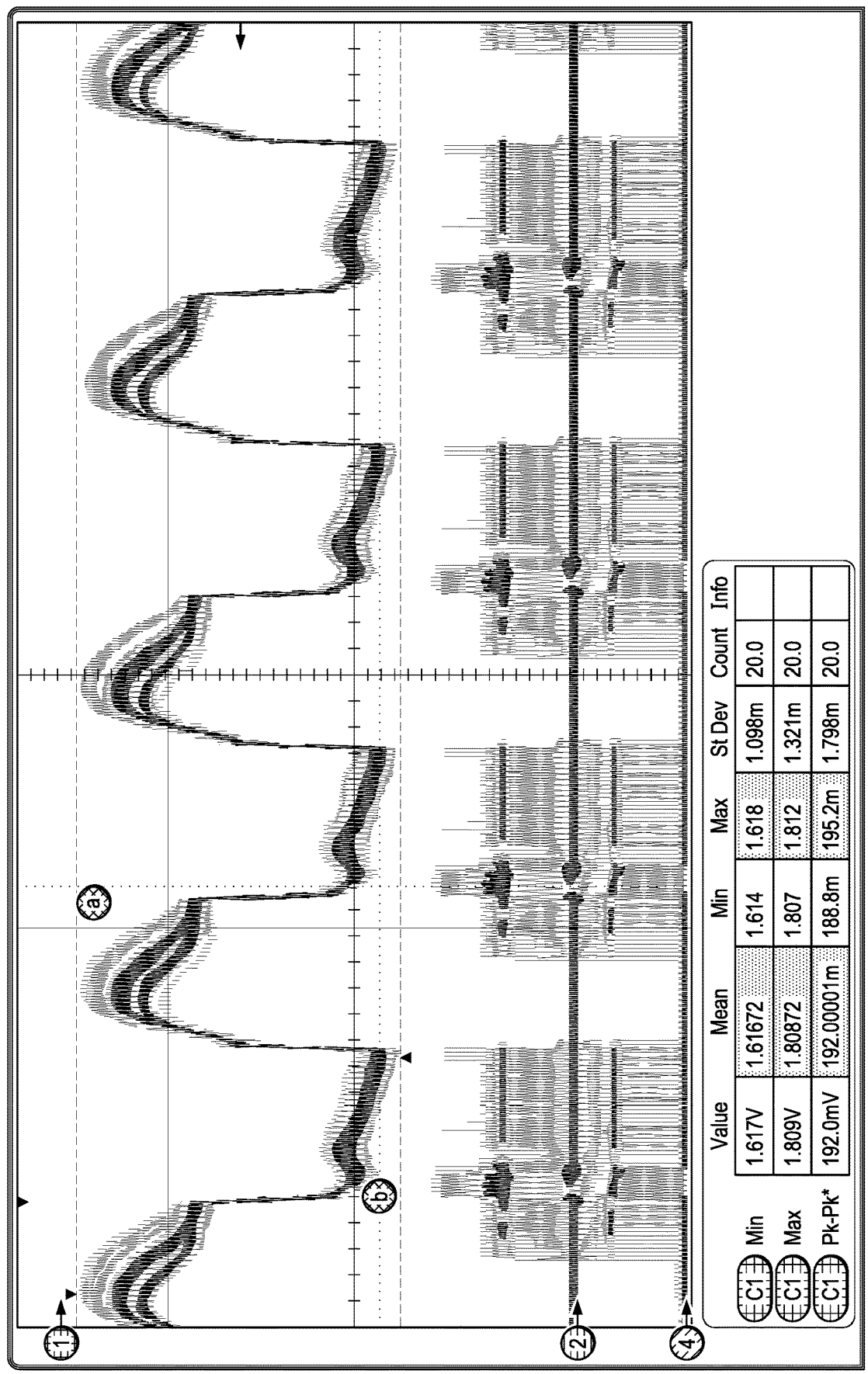
Figure 4B:
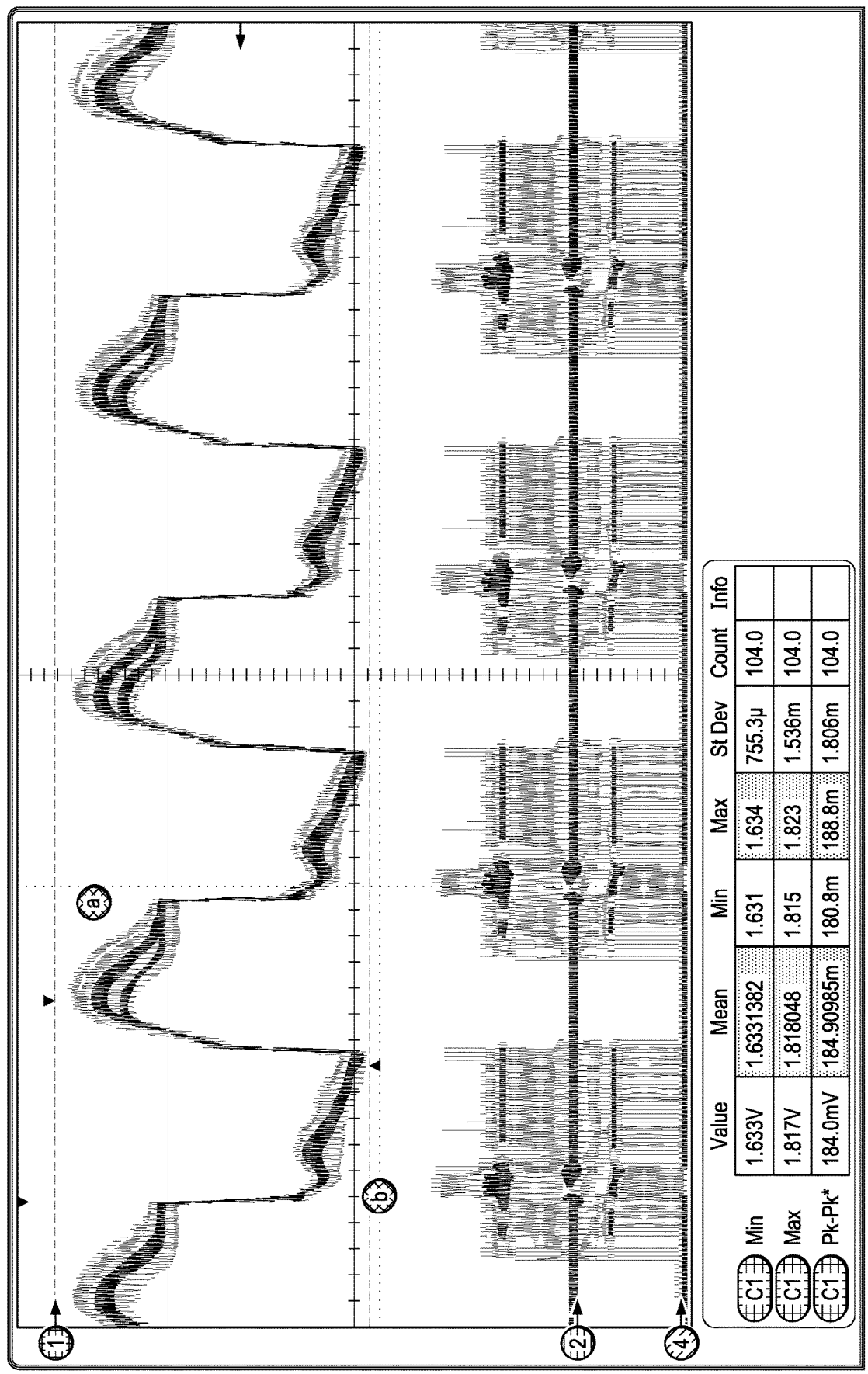
Figure 4C:
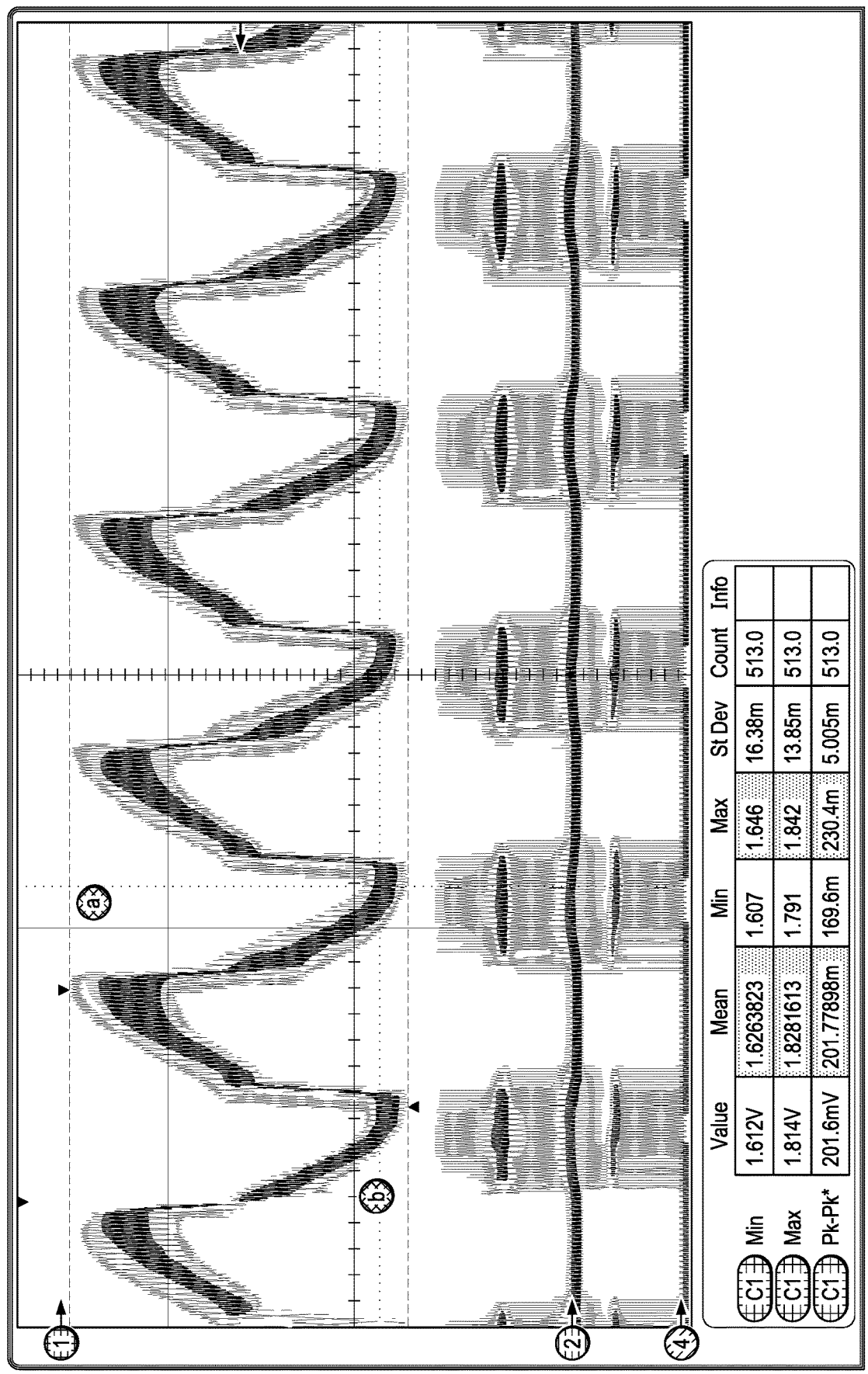
Figure 4D:
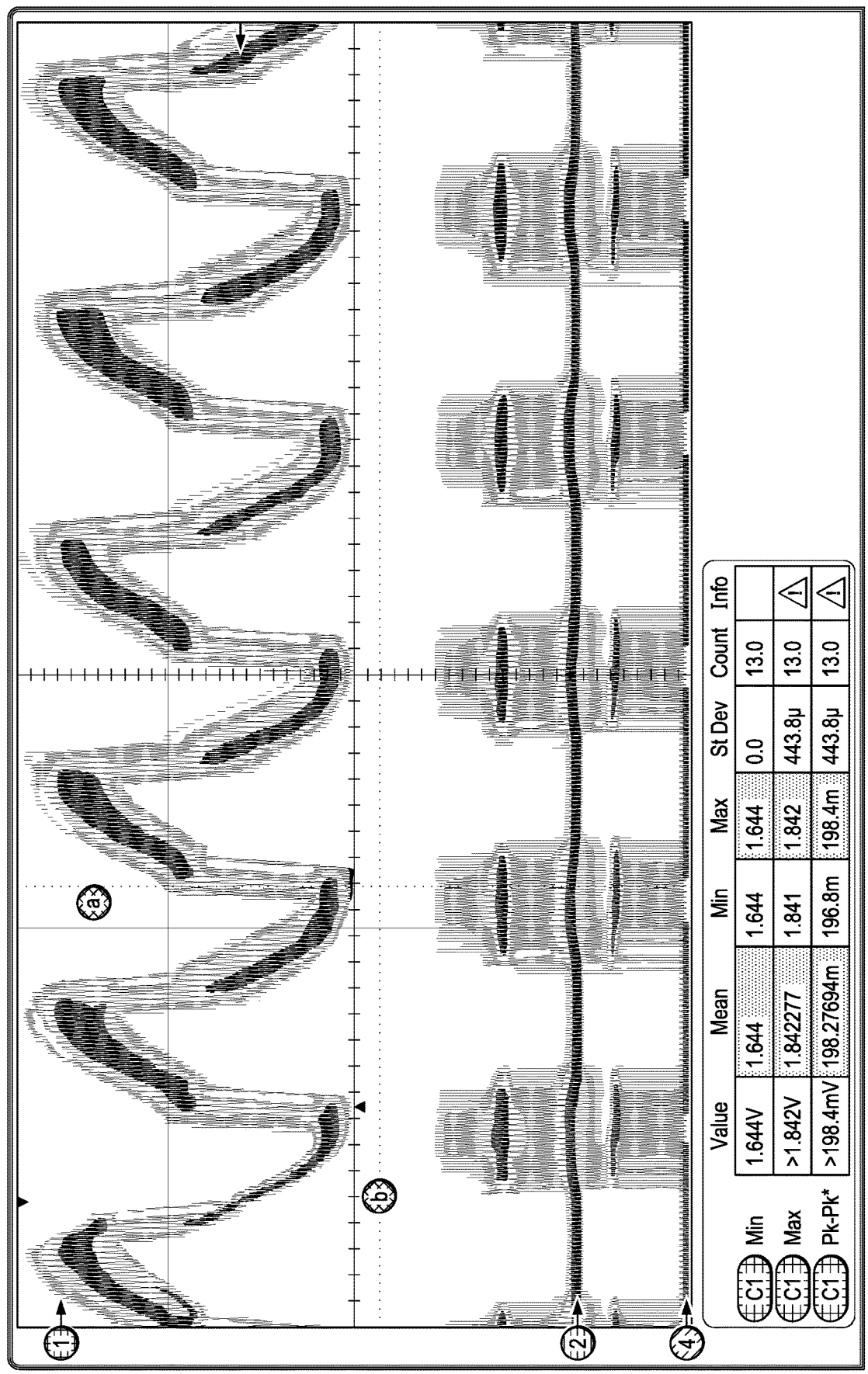

Tests have also been run on actual implementations of the circuit. In a test run utilizing the circuit of FIG. 1A, using load transients from 57 amps to 200 amps and slew rate of 800 amps/microsecond, the worst-case undershoot condition occurred at 78 kHz with fifty percent duty cycle. FIG. 4A shows the experimental results of this worst-case undershoot condition. FIG. 4B shows the experimental results under the same conditions, but using an implementation of DC-DC converter 100B. In this second test, the effectiveness of the proposed dynamic integration was demonstrated and the minimum output voltage was increased by 16 millivolts. FIG. 4C depicts an additional experimental result at 280 kHz load transients without dynamic integration, while FIG. 4D depicts the results at 280 kHz load transients with dynamic integration. This second experiment demonstrated a minimum output voltage that was increased by 32 millivolts. This result occurred in the region where the load frequency exceeded the loop bandwidth, yet the dynamic integration allowed improvements to the minimum output voltage without adding output capacitance. Conventional applications have not been able to match this result. This provides an important advantage to ensure CPU performance and functionality.

The example implementation shown in FIG. 1B was designed for a specific application and contains elements that are not necessary in all implementations. Additionally, while the application shown is for a multiphase power converter, the disclosed control circuit can also be utilized for a single phase power converter. A more generalized version of control circuit 120B is shown in FIG. 1C as control circuit 120C. Control circuit 120C includes a PWM generator 133, comparators 124, 128 and integrator 126. Integrator 126 and comparator 128 each receive output signal $V_{OUT}$ and reference signal $V_C$. Comparator 128 provides the dynamic integration signal DYN_INT to integrator 126 to dynamically change the integration constant when a difference is detected. Integrator 126 provides the integrated error signal $V_{INT}$. $V_{INT}$ is added to the signal $V_{OUT}$ at adder 111 and the resulting compensation voltage $V_{COMP}$ is provided to the inverting input of comparator 124. Comparator 124 compares $V_{COMP}$ to reference voltage $V_C$ and provides an adjustment voltage $V_{ADJ}$ to PWM generator 133. Those skilled in the art will recognize that elements from the implementation of control circuit 120B can be added to the implementation of control circuit 120C, either singly or in combination. In implementations where multiphase operation is desired, PWM generator 133 can be replaced by PWM generator3. In implementations where the amount of current is to be taken into effect, the total translated current signal 110 can also be received at adder 111, while integrator 126 and comparator 128 can receive voltage droop value, $V_{DROOP}$, rather than $V_{OUT}$. In implementations where the use of a ramp generator is desired, the reference voltage $V_C$ that is provided to comparator 124 can be replaced by a ramp voltage $V_{RAMP}$ that is provided by ramp generator 130.

Disclosed example implementations have demonstrated an "asymmetric" integration that is activated during periods when the load transients occur at a high repetition rate. The change to the integration constant triggered in this situation leads to a DC offset of the regulated output voltage that helps to prevent undershoot performance even when the load frequency is beyond the loop bandwidth. Such an offset is normally considered undesirable and changes to the integrator have been avoided in the past. However, the disclosed DC offset has proven to be quite beneficial.

Although various example implementations have been shown and described in detail, the claims are not limited to any particular implementation or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described implementations that are known to those of ordinary skill in the art are expressly incorporated herein by reference and are intended to be encompassed by the present claims. Accordingly, those skilled in the art will recognize that the example implementations described herein can be practiced with various modifications and alterations within the spirit and scope of the claims appended below.

What is claimed is:

1. A control circuit for a DC-DC converter, the control circuit comprising:
an integrator coupled to receive a first reference voltage and a first voltage that comprises an output voltage for the DC-DC converter, the integrator being further coupled to provide an integrated error signal; and
a first comparator coupled to receive the first reference voltage and the first voltage and to provide a dynamic-integration signal that adjusts an integration time constant of the integrator.

2. The control circuit for the DC-DC converter as recited in claim 1 further comprising:
a second comparator coupled to receive a second reference voltage and a second voltage that comprises the integrated error signal and the output voltage, the second comparator being further coupled to provide an adjustment voltage; and
a PWM generator coupled to receive the adjustment voltage.

3. The control circuit for the DC-DC converter as recited in claim 2 wherein the second voltage further comprises a total translated current signal that comprises a sum of voltages representing currents through each of multiple separate phases of the DC-DC converter.

4. The control circuit for the DC-DC converter as recited in claim 1 wherein the first voltage further comprises a scaled total translated current signal that is proportional to a total inductor current in the DC-DC converter.

5. The control circuit for the DC-DC-converter as recited in claim 2 wherein the second reference voltage comprises a ramp voltage.

6. The control circuit for the DC-DC converter as recited in claim 2 wherein the control circuit provides control for a multiphase DC-DC converter.

7. The control circuit for the DC-DC converter as recited in claim 2 wherein the control circuit provides control for a single phase DC-DC converter.

8. A DC-DC converter comprising:
an integrator coupled to receive a first reference voltage and a first voltage that comprises an output voltage for the DC-DC converter, the integrator being further coupled to provide an integrated error signal; and
a first comparator coupled to receive the first reference voltage and the first voltage and to provide a dynamic-integration signal that adjusts an integration time constant of the integrator.

9. The DC-DC converter as recited in claim 8 further comprising:
a second comparator coupled to receive a second reference voltage and a second voltage that comprises the integrated error signal and the output voltage, the second comparator being further coupled to provide an adjustment voltage; and
a PWM generator coupled to receive the adjustment voltage.

10. The DC-DC converter as recited in claim 8 wherein the first voltage further comprises a scaled total translated current signal that is proportional to a total inductor current in the DC-DC converter.

11. The DC-DC converter as recited in claim 10 wherein the second voltage further comprises a total translated current signal that comprises a sum of voltages representing currents through each of multiple separate phases of the DC-DC converter.

12. The DC-DC-converter as recited in claim 9 wherein the second reference voltage comprises a ramp voltage.

13. The DC-DC converter as recited in claim 9 wherein the control circuit controls a single phase DC-DC converter.

14. The DC-DC converter as recited in claim 9 wherein the control circuit controls a multiphase DC-DC converter.

15. The DC-DC converter as recited in claim 14 further comprising a first phase that comprises:
a first high-side field effect transistor (FET) and a first low-side FET coupled in series between an input node and a lower rail;
a first inductor having a first terminal coupled to a point between the first high-side FET and the first low-side FET and a second terminal coupled to an output node; and
a first capacitor coupled in parallel with the output node.

16. The DC-DC converter as recited in claim 15 further comprising at least one additional phase, each additional phase of the at least one additional phase comprising:
a respective high-side FET and a respective low-side FET coupled in series between the upper rail and the lower rail; and
a respective inductor having a first terminal coupled to a point between the respective high-side FET and the respective low-side FET and a second terminal coupled to the output node.

* * * * *